Sept. 4, 1928.

R. H. CHILTON

SPRING SHACKLE

Filed April 30, 1927

1,683,334

Inventor
Ralph H. Chilton
By Spencer Hardman & Fehr
his Attorneys

Patented Sept. 4, 1928.

1,683,334

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed April 30, 1927. Serial No. 187,837.

This invention relates to flexible coupling members, especially such as are adapted for use as spring shackles on automobiles.

An object of this invention is to provide an improved form of flexible coupling of vulcanized rubber and fabric material having the advantages of economy of manufacture and assembly in place upon the parts connected thereby, increased efficiency of operation and long life.

A more specific object is to provide a coupling member having a flexible rubberized fabric casing substantially filled with vulcanized rubber material and secured at opposite portions thereof to the parts interconnected thereby, the rubber material being soft and elastic adjacent said opposite portions and relatively stiff in the intermediate portion of said casing, with the following advantages: (1) The soft rubber portions facilitate the swinging movement of the molded unit to permit easy endwise movement of the spring end; (2) the relatively stiff rubber portion maintains the form of the molded unit and resists high compression loads without excessive lateral bulging of the rubber material and, by so minimizing distortion of the rubber and fabric, lengthens the life thereof; (3) the molded unit highly resists relative lateral movement or "side sway" between the parts connected thereby, as will be obvious from the construction thereof.

Another object is to provide a convex seat for the molded unit to facilitate the rolling movement thereof during endwise movement of the spring end.

Further objects and advantages of the present invention will be apparent from the following description, reference being had to the accompanying drawing, wherein a preferred form of embodiment of the present invention is clearly shown.

Figure 1:
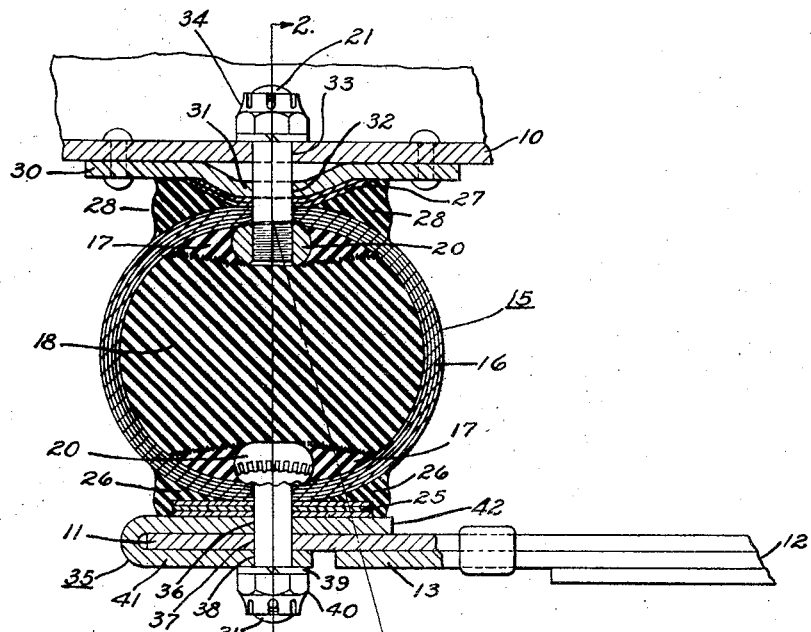
Fig. 1 illustrates a shackle built according to this invention mounted on the rear end of the front spring of an automobile chassis. The vertical section is taken on line 1—1 of Fig. 2.
Figure 2:
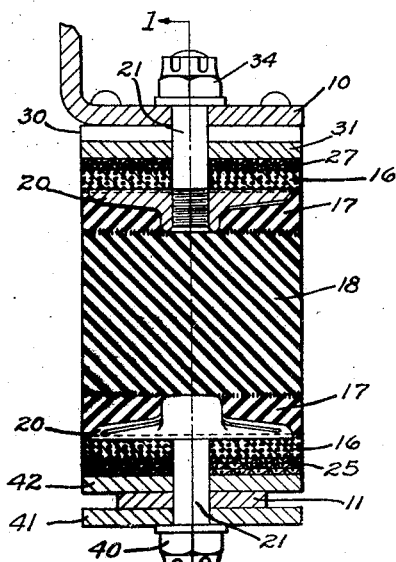
Fig. 2 is a transverse section taken on the line 2—2 of Fig. 1.

Numerals 10 and 11 designate the two relatively movable parts connected by the shackle, 10 being the chassis side rail or a fitting rigidly fixed thereto, and 11 the projecting end of the long leaf of the leaf spring 12.

The molded unit, designated as a whole by 15, comprises a flexible endless rubberized fabric casing 16 which preferably is composed of a plurality of turns of rubberized cord fabric with the non-extensible cords thereof extending in a peripheral direction. This flexible casing 16 is provided with the molded in situ metal clamping inserts 20 having shanks 21, integral therewith or rigidly fixed thereto, projecting outwardly through apertures in the casing 16, as clearly shown. The interior of casing 16 is filled with rubber material vulcanized in place, the portions 17 thereof adjacent the metal inserts 20 being relatively soft and elastic while the intermediate portion 18 is relatively stiff against distortion but preferably yet possesses some elasticity. This casing 16 and its contents may be molded either in a cylindrical form and flattened slightly by the compression under which it is put in use, or in a slightly flattened cylindrical form, as clearly shown in Fig. 1. Preferably a relatively stiff rubberized fabric seat 25 is molded in place upon the bottom of casing 16 and the wedge-shaped spaces 26 between seat 25 and casing 16 filled with soft elastic rubber molded in place. Preferably a relatively stiff rubberized fabric seat 27, outwardly concave in form, is molded upon the top of casing 16 and the wedge-shaped spaces 28 between seat 27 and casing 16 filled with soft elastic rubber. This upper seat 27 is adapted to be clamped upon and seat snugly upon a metal seat 30, fixed to member 10, having a straight convex ridge 31 extending transversely as clearly shown. Preferably seats 25 and 27 are originally molded in such outwardly concave form that when they are clamped in place by the metal inserts 20 they will flatten out somewhat under the pressure and so snugly hug the metal seats. Of course, if desired, the lower seat could be made similar to the upper seat with only a very small increase in cost.

This molded unit 15, made as described above, is vulcanized as a whole in the die mold, the desired degree of softness or hardness of the rubber material 17, 18, 26 and 27 being obtained by the amount of sulphur and accelerator in the unvulcanized rubber compounds used in forming these respective portions.

In assembling this molded unit 15 in place, a U-shaped metal seat member 35 of the full width of the unit 15 is first telescoped upon the projecting end 11 of the long leaf. The lower shank 21 of the clamping insert 20 is passed through registering holes 36, 37, 38 in the seat member 35 and leaf 11 and the lock washer 39 and nut 40 applied. When nut 40 is drawn up very tight the clamping insert 20 clamps the adjacent portion of casing 16 and fabric seat 25 and the metal member 35 firmly upon the spring leaf 11. Preferably the lower plate 41 of member 35 is shorter than the upper plate 42 thereof in order to permit the second leaf 13 of spring 12 to extend under the upper plate 42 and partially under unit 15 and thereby reinforce the leaf 11. This construction is described and claimed in my copending application, Serial No. 179,361, filed March 29, 1927. By providing seat 30 with a greater lateral width than leaf 11 the lateral width of unit 15 may be made as large as good design dictates. Obviously the upper member 30 may easily be made the full width of the unit 15 so that unit 15 may easily have double the width of leaf 11 if it be desired. The upper shank 21 is passed through a hole 32 in ridge 31 and through a hole 33 in member 10 and nut 34 applied thereto and tightened to firmly clamp the upper portion of casing 16 and the concave fabric seat 27 in place.

Preferably the seat member 30 is so located relative to the hole 37 in spring leaf 11 that holes 32 and 37 will be in substantial vertical alignment when spring 12 is deflected by a force greater than the average normal down load exerted by the shackle. This position is illustrated in Fig. 1, and when in this position the unit 15 is upright and not distorted except by the weight load. Now for normal or less than normal down loads, the end of leaf 11 will be shifted to the right (as seen in Fig. 1) and therefore unit 15 will be distorted by a rolling motion so that its center line will be shifted to say, the line 50. If now the vehicle passes over a bump in the road spring 12 will be given an oscillating movement, and during such movement the unit 15 will permit the end of leaf 11 to move easily down and to the left (as seen in Fig. 1) since that relieves the distortion on the shackle, but unit 15 will yieldably resist the opposite motion of the spring since such motion again puts rolling distortion thereupon. It will now be clear that the shackle will act after the manner of a spring snubber, that is, it permits easy spring deflection in one direction but absorbs energy from the spring when it deflects in the opposite direction.

The soft and elastic rubber portions 17, 26 and 28 permit relatively easy rolling or swinging distortion of unit 15 since it is obvious that the pivoting of the unit occurs adjacent the two clamping inserts 20. The stiff rubber portion 18 swings to and fro without much distortion by such swinging. Portion 18 is made of such stiffness as to properly resist the compression load upon the shackle without excessive lateral bulging of the rubber material at the unconfined lateral sides of unit 15. It may be made quite hard but preferably it is made as yieldable as other conditions permit since its yielding character increases the smoothness of riding of the car body. On severe rebounds the shackle may be put under tension, at which time portion 18 again retains the form of unit 15 by resisting the tendency thereof to elongate in a vertical direction.

While the form of embodiment of the present invention as herein disclosed, constitutes a preferred form, it is to be understood that other forms might be adopted, all coming within the scope of the claims which follow.

What is claimed is as follows:

1. An extension shackle connecting two relatively movable members, said shackle comprising: a flexible rubberized fabric casing having opposite portions connected respectively to said movable members, and elastic rubber material filling said casing and vulcanized thereto, said rubber material being more elastic adjacent said movable members than in the intermediate portion thereof.

2. An extension shackle connecting two relatively movable members, said shackle comprising: a flexible rubberized fabric casing, two metal clamping inserts at opposite portions of said casing for fixing said portions to said movable members respectively, and elastic rubber material filling said casing and vulcanized thereto, said rubber material being more easily distortable adjacent said inserts than in the intermediate portion thereof.

3. An extension shackle connecting two relatively movable members, said shackle comprising: a flexible rubberized fabric casing, two metal clamping inserts at opposite portions of said casing for fixing said portions to said movable members respectively, relatively soft elastic rubber material vulcanized in place within said casing about said metal inserts, and relatively stiff elastic rubber material vulcanized in place within said casing in the central portion thereof.

4. An extension shackle connecting two relatively movable members, said shackle comprising: a cylindrically shaped rubberized fabric casing having opposite portions fixed to said movable members respectively, and elastic rubber material filling said casing and vulcanized thereto, said rubber material being relatively easily distortable adjacent said movable members and relatively stiff at the intermediate portion thereof.

5. A shackle connecting two relatively movable members, said shackle comprising: an endless flexible rubberized fabric casing, molded in situ metal clamping inserts at opposite portions of said casing for fixing said portions to said movable members respectively, and elastic rubber material substantially filling said casing and vulcanized thereto, said material being sufficiently soft and pliable at portions adjacent said inserts to permit easy swinging movement of the casing upon said inserts and sufficiently hard at the intermediate portion of said casing to maintain the form of said casing substantially constant during such swinging movement.

6. An extension shackle connecting two relatively movable members, comprising: a molded rubber and textile unit having a flexible textile casing vulcanized upon an interior elastic rubber block, said block being relatively hard at its central portion to resist compression loads and being relatively soft adjacent its portions seated upon said movable members whereby to permit easy pivotal movement therewith.

7. A spring shackle connecting the end of a leaf spring to a member supported thereby, said shackle comprising: a cylindrically shaped rubberized fabric casing having metal inserts at opposite portions for fixing said casing to said spring and member respectively, and elastic rubber material substantially filling said casing and vulcanized in place therein, said rubber material being relatively easily distortable adjacent said inserts but relatively stiff against distortion over the major portion thereof.

8. A spring shackle connecting the end of a leaf spring to a member supported thereby, said shackle comprising: a cylindrically shaped rubberized fabric casing having metal inserts at opposite portions for fixing said casing to said spring and member respectively, and elastic rubber material substantially filling said casing and vulcanized in place therein, said rubber material being soft and elastic adjacent said inserts but having a relatively rigid transverse bridge across the intermediate portion of said casing.

9. A spring shackle connecting the end of a leaf spring to a member supported thereby, said shackle comprising: a cylindrically shaped rubberized fabric casing having metal inserts at opposite portions for fixing said casing to said spring and member respectively, and elastic rubber material substantially filling said casing and vulcanized in place therein, a seat having a convex ridge upon which said cylindrical casing is adapted to roll upon deflection of said spring, and elastic rubber filling the wedge shaped spaces between said convex ridge and said casing.

In testimony whereof I hereto affix my signature.

RALPH H. CHILTON.